US008385531B2

(12) United States Patent
Chavez et al.

(10) Patent No.: US 8,385,531 B2
(45) Date of Patent: Feb. 26, 2013

(54) PERFORMING ROUTING OF A PHONE CALL BASED ON MUTUAL CONTACTS OF A CONTACT LIST

(75) Inventors: Timothy R. Chavez, Austin, TX (US); Jacob D. Eisinger, Austin, TX (US); Michael C. Hollinger, Austin, TX (US); Jennifer E. King, Austin, TX (US); Christina K. Lauridsen, Austin, TX (US); Fabian F. Morgan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1331 days.

(21) Appl. No.: 12/115,673

(22) Filed: May 6, 2008

(65) Prior Publication Data

US 2009/0279680 A1   Nov. 12, 2009

(51) Int. Cl.
*H04M 7/00* (2006.01)
(52) U.S. Cl. ......... 379/221.01; 379/221.02; 379/221.05; 379/211.01; 379/211.02; 379/201.02; 455/445; 455/446; 455/417
(58) Field of Classification Search .......... 379/221.01, 379/221.02, 221.05, 211.01, 211.02, 212.01, 379/201.02; 455/445, 446, 417
See application file for complete search history.

(56) References Cited

U.S. PATENT DOCUMENTS

| | | | |
|---|---|---|---|
| 6,404,860 B1 | 6/2002 | Casellini | |
| 6,421,437 B1 | 7/2002 | Slutsman | |
| 6,741,688 B1 | 5/2004 | Yau | |
| 7,260,205 B1 | 8/2007 | Murphy | |
| 7,319,744 B1 | 1/2008 | Arnold | |
| 7,356,307 B1* | 4/2008 | Parker | 455/41.2 |
| 2002/0126679 A1* | 9/2002 | Morton | 370/401 |
| 2002/0186828 A1* | 12/2002 | Bushnell | 379/211.02 |
| 2002/0194331 A1* | 12/2002 | Lewis et al. | 709/224 |
| 2003/0033394 A1 | 2/2003 | Stine | |
| 2003/0059016 A1* | 3/2003 | Lieberman et al. | 379/201.03 |
| 2003/0138085 A1 | 7/2003 | Forman | |
| 2005/0286705 A1 | 12/2005 | Contolini et al. | |
| 2006/0077956 A1 | 4/2006 | Saksena | |
| 2006/0077957 A1 | 4/2006 | Reddy | |
| 2006/0093118 A1 | 5/2006 | Agrawal et al. | |
| 2006/0135138 A1 | 6/2006 | Lazaridis | |
| 2006/0227957 A1* | 10/2006 | Dolan et al. | 379/212.01 |
| 2007/0232277 A1 | 10/2007 | Spalink | |

(Continued)

OTHER PUBLICATIONS

U.S. Appl. No. 12/115,649, "Method and System for Performing Proximity Based Routing of a Phone Call," Non-Final Office Action dated Aug. 9, 2011.

(Continued)

*Primary Examiner* — Joseph J Nguyen
(74) *Attorney, Agent, or Firm* — Yudell Isidore Ng Russell PLLC

(57) ABSTRACT

A method, system, and computer program for routing an outgoing communication in real time is presented. A communication is received from a caller to an intended receiving wireless telecommunication device. In response to the communication failing to connect to the intended receiving wireless telecommunication device, scan of other alternate telecommunication devices is initiated to determine if other communication devices are available for receiving a re-route of the original communication. If an alternate telecommunication device is available to receive the communication, then the communication is rerouted to the preferred alternate telecommunication device based on the alternate telecommunication device being a mutual contact of the contact list of the caller telecommunication device and the mapping profile of the intended receiving telecommunication device.

20 Claims, 3 Drawing Sheets

U.S. PATENT DOCUMENTS

| | | |
|---|---|---|
| 2007/0287438 A1 | 12/2007 | Hansen |
| 2008/0004009 A1 | 1/2008 | Caldwell |
| 2008/0112554 A1 | 5/2008 | Arnold |
| 2008/0130554 A1 | 6/2008 | Gisby |
| 2008/0165948 A1* | 7/2008 | Ryals et al. .............. 379/266.1 |
| 2009/0023427 A1 | 1/2009 | Kahn |
| 2009/0086947 A1 | 4/2009 | Vendrow |
| 2009/0279677 A1 | 11/2009 | Chavez |
| 2009/0280785 A1 | 11/2009 | Chavez |
| 2009/0280787 A1 | 11/2009 | Chavez |
| 2009/0280817 A1 | 11/2009 | Chavez |
| 2009/0280818 A1 | 11/2009 | Chavez |

OTHER PUBLICATIONS

U.S. Appl. No. 12/115,659, "Method and System for Performing Caller Based Routing of a Phone Call," Non-Final Office Action dated Aug. 9, 2011.

U.S. Appl. No. 12/115,654, "Method and System for Performing Recipient Based Routing of a Phone Call," Non-Final Office Action dated Jun. 28, 2011.

U.S. Appl. No. 12/115,663, "Method and System for Performing Routing of a Phone Call Through a Third Party Device," Non-Final Office Action dated Aug. 4, 2011.

* cited by examiner

PERFORMING ROUTING OF A PHONE CALL BASED ON MUTUAL CONTACTS OF A CONTACT LIST

BACKGROUND OF THE INVENTION

1. Technical Field

The present invention relates in general to telecommunications, and in particular to cellular phones. Still more particularly, the present invention relates to performing routing of a phone call based on mutual contacts of a contact list.

2. Description of the Related Art

Cellular (cell) phones have become a ubiquitous aid in allowing a person to be constantly accessible. However, there are times when a person may not desire, or may be unable, to take an incoming call.

SUMMARY OF THE INVENTION

A method, system, and computer program for routing an outgoing communication in real time is presented. A communication is received from a caller to an intended receiving wireless telecommunication device. In response to the communication failing to connect to the intended receiving wireless telecommunication device, scan of other alternate telecommunication devices is initiated to determine if other communication devices are available for receiving a re-route of the original communication. If an alternate telecommunication device is available to receive the communication, then the communication is rerouted to the preferred alternate telecommunication device based on the alternate telecommunication device being a mutual contact of the contact list of the caller telecommunication device and the mapping profile of the intended receiving telecommunication device.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

Figure 1:
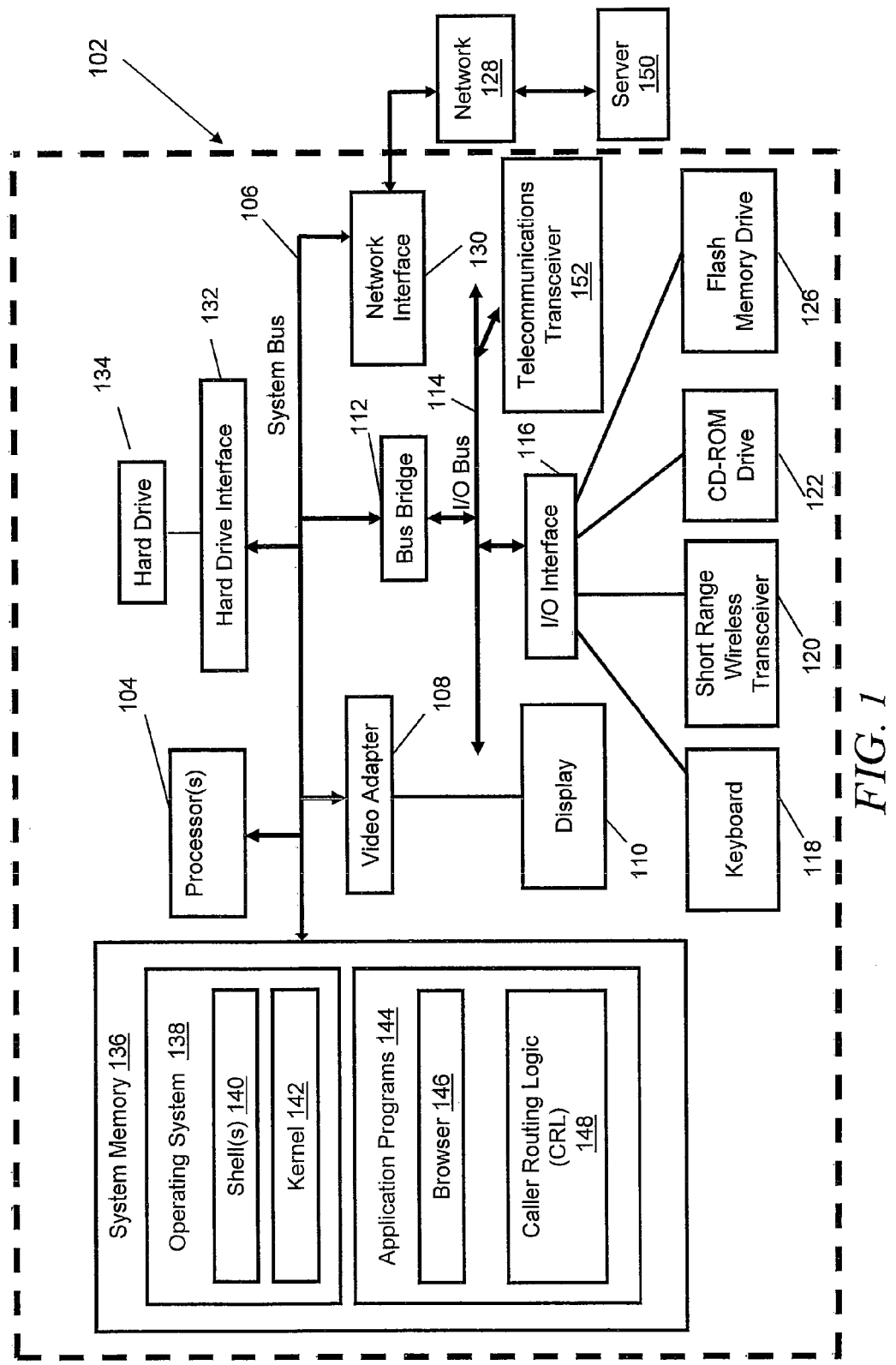
FIG. 1 is a block diagram of a data processing system in which the present invention may be implemented.

With reference now to FIG. 1, there is depicted a block diagram of an exemplary computer 102 in which the present invention may be implemented. Computer 102 includes one or more processors 104 that are coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a Short Range Wireless Transceiver 120, a Compact Disk-Read Only Memory (CD-ROM) drive 122, a floppy disk drive 124, and a flash drive memory 126. Keyboard 118 may be a standard keyboard (e.g., QWERTY style or similar), or a condensed alphanumeric keypad. The format of the ports connected to I/O interface 116 may be any known to those skilled in the art of computer architecture, including but not limited to Universal Serial Bus (USB) ports. Short Range Wireless Transceiver 120 utilizes short range wireless electromagnetic signals (e.g. wireless spread spectrum, radio frequency (RF), infrared (IR), etc) to allow Computer 102 to transmit or receive voice or data with another telecommunication device.

Computer 102 is able to communicate with a software deploying server 150 via a network 128 using a network interface 130, which is coupled to system bus 106. Network interface 130 may utilize a wired, or a wireless technology such as a cellular broadcast to connect with Network 128. Network 128 may be an external network such as the Internet, or an internal network such as an Ethernet or a Virtual Private Network (VPN). Note the software deploying server 150 may utilize a same or substantially similar architecture as computer 102.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (e.g., computer 102) to send and receive network messages to the Internet using Hyper-Text Transfer Protocol (HTTP) messaging, thus enabling communication with software deploying server 150.

Application programs 144 in computer 102's system memory (as well as software deploying server 150's system memory) also include a Caller Routing Logic (CRL) 148. CRL 148 includes code for implementing the processes described in FIGS. 2-3. In one embodiment, computer 102 is able to download CRL 148 from software deploying server 150, including in an "on demand" basis, as described in greater detail below in FIGS. 2-3.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 150 performs all of the functions associated with the present invention (including execution of CRL 148), thus freeing computer 102 from having to use its own internal computing resources to execute CRL 148.

Note also the architecture shown in FIG. 1 for computer 102 may be substantially implemented in Caller Telecommunication Device (CTD) 202, Host Carrier 204, Intended Receiving Wireless Telecommunication Device (IRWTD) 206, and Alternate Telecommunication Devices (ATDs) 208a-n shown below in FIG. 2. That is, although CTD 202, IRWTD 206 and ATDs 208a-n are described as cellular phones, by including a telecommunications transceiver 152 in the architecture of computer 102, the appropriate elements illustrated as components of computer 102 can operate as a "smart" phone that communicates with a host carrier (e.g., Host Carrier 204 shown below in FIG. 2), or a Plain Old Telephone System (POTS) system. Additionally, by including a Short Range Wireless Transceiver 120 in the architecture of computer 102, the appropriate elements illustrated as components of computer 102 can operate as an "ad-hoc" network device that communicates with another telecommunication device within a wireless short range proximity to computer 102 (e.g., Alternate Telecommunication Devices (ATDs) 208a-n shown below in FIG. 2).

Figure 2:
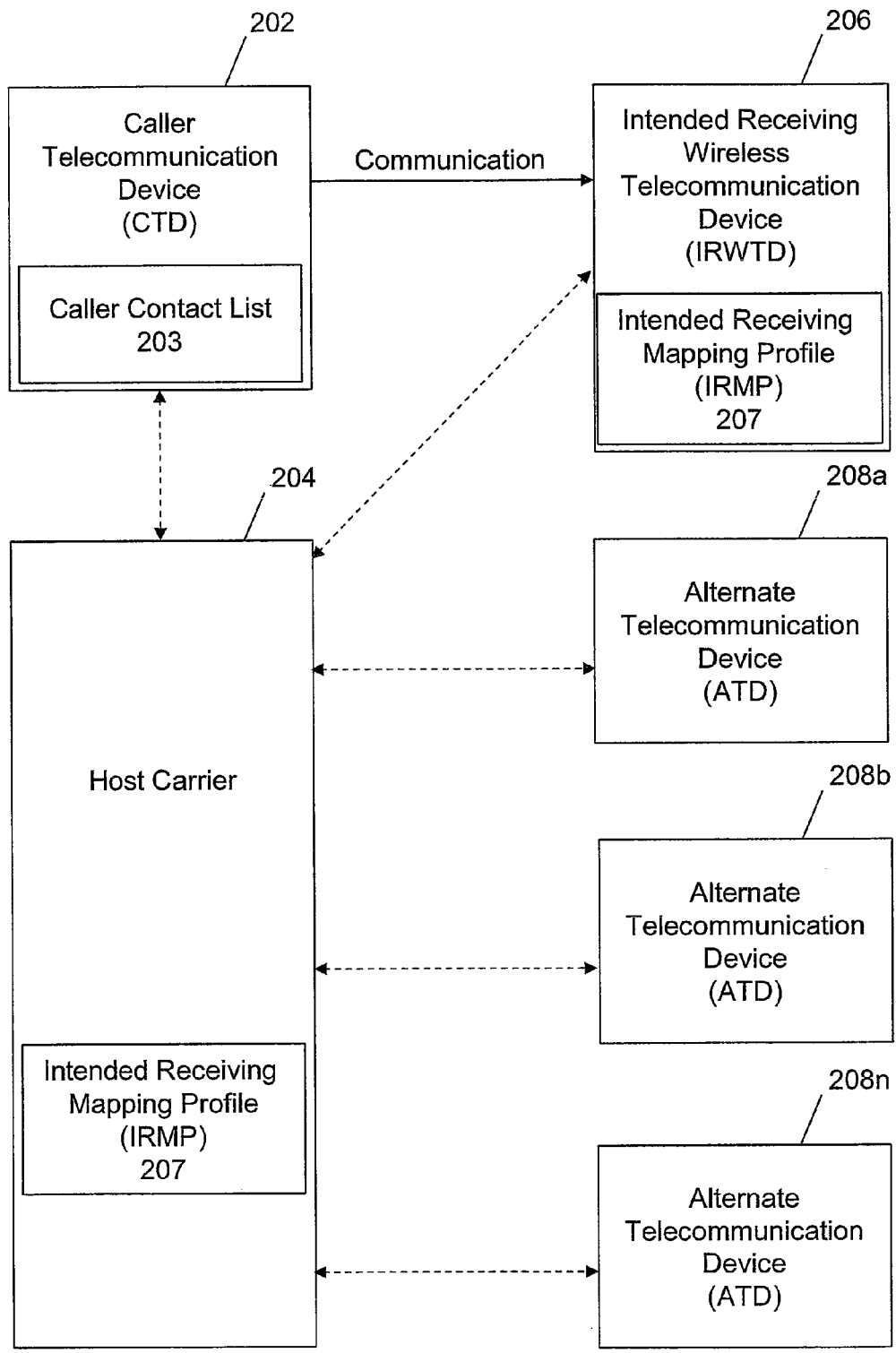
FIG. 2. is a block diagram of an exemplary system for performing re-routing of a phone call to a alternate telecommunication device.

With reference now to FIG. 2, a block diagram of the routing system used in an exemplary embodiment of the present invention is presented. A Caller Telecommunication Device (CTD) 202 (e.g., a cell phone, a Plain Old Telephone System (POTS) land line, a cell-capable Personal Assistant Device (PDA), etc.) connected to Host Carrier 204 initiates a communication (voice call or notification message) to an Intended Receiving Wireless Telecommunication Device (IRWTD) 206. Host Carrier 204 is a remote service host such as a cellular service provider that is remotely connected to both CTD 202 and IRWTD 206. If IRWTD's 206 ringer is "on", and thus the called user is available, the communication will be connected. As described below, however, when IRWTD 206 is otherwise unavailable (e.g., IRWTD 206 is 'off', the ringer for IRWTD 206 is 'off', when the call to IRWTD 206 goes unanswered, etc), the communication intended for IRWTD 206 may be routed to a Alternate telecommunication device (ATD) 208a-n by comparing the Intended Receiving Mapping Profile (IRMP) 207 of IRWTD 206 with the Caller Contact List 203 of CTD 202 for a common contact.

When the user of IRWTD 206 is unavailable a first routing option is for the caller who is using CTD 202 to leave a voicemail message, which will be retrievable when IRWTD 206 is either turned back on or the user becomes available. However, IRWTD 206 may optionally initiate a re-routing attempt of the communication to a common contact of IRMP 207 and Caller Contact List 203. IRMP 207 comprises of user and contact information of IRWTD 206 associated to the IRWTD's 206 unique Media Access Control (MAC) address, in addition to preferences for routing incoming communication to specific alternate telecommunication devices. IRMP 207 is configured by the user of IRWTD 206 at a time prior to the communication being initiated by CTD 202, and is stored locally on IRWTD 206 or remotely on Host Carrier 204. Remote storage of IRMP 207 is possible when the user of IRWTD 206 chooses to manually synchronize IRMP 207 to Host Carrier 204. Furthermore, this synchronization may be autonomously initiated by software internal to Host Carrier 204 or IRWTD 206. IRMP 207 includes the MAC address and personal contact information (e.g., full name, job title, work/home address, email address, cellular phone number, alternate phone numbers, etc) for the user of IRWTD 206 and a contact list containing similar contact information of all ATDs 208a-n known to the user of IRWTD 206. The MAC address is a unique identifier of a telecommunication device to other telecommunication devices. Similarly, Caller Contact List 203 of CTD 202 comprised of user and contact information (e.g., full name, job title, work/home address, email address, cellular phone number, alternate phone numbers, etc) for persons known to the user of CTD 202, and is stored locally on CTD 202.

When CTD 202 initiates a communication to IRWTD 206 and detects that IRWTD 206 is unavailable it checks for the presence of IRMP 207 stored on IRWTD 206, or remotely on Host Carrier 204, when IRWTD 206 is a subscriber to Host Carrier 204. When the presence of IRMP 207 has been established it is transmitted to CTD 202, where software internal to CTD 202 interprets IRMP 207. Software internal to CTD 202 (e.g., CRL 148) then compares the information of contacts of IRMP 207 to Caller Contact List 203. This process may compare all contained information of each user (e.g., full name, job title, work/home address, email address, cellular phone number, alternate phone numbers, MAC address, etc) of both profiles to identify common ATDs 208a-n. When one or more common contacts have been established, IRMP 207 and Caller Contact List 203 are both updated to contain any new contact information stored on the other device.

For example, when a re-route of a communication is being attempted and IRMP 207 contains the MAC address and email of an ATD 208a and Caller Contact List 203 contains the MAC address and phone number for ATD 208a, software internal to CTD 202 can then route the phone call to the ATD 208a by utilizing the common information of both devices. Both Caller Contact List 203 and IRMP 207 are then updated so both devices will contain the email and phone number for the ATD 208a.

Upon CTD 202 determining which ATDs 208a-n common to both Caller Contact List 203 and IRMP 207, CTD 202 then determines which ATDs 208a-n are proximate to IRWTD 206 and available for receiving a re-route of the communication by initiating a proximate short range scan by ATDs 208a-n for the presence of IRWTD 206. CTD 202 instructs the common ATDs 208a-n to scan for IRWTD 206 in physically proximate short range by utilizing a common hardware based wireless technology internal to IRWTD 206 and ATD 208a-n, such as a short-range radio or infrared signal, to determine if any other ATDs 208a-n are within a physically proximate short range of ATD 208a, and are available to receive the incoming voice call. This connection between Host Carrier 204 and IRWTD 206 may only be initialized when IRWTD 206 is turned 'on' but is not responsive to the incoming call. Optionally an unlicensed secure wireless personal area network (PAN), may be implemented for wireless transmission. The short range of the device is the maximum range of communication available between IRWTD 206 and ATD 208*a-n* without the use of a network carrier service (e.g., a cell phone carrier service), and is further determined by the internal wireless technology common to ATDs 208*a-n*.

Upon successfully comparing one or more contacts of IRMP 207 and Caller Contact List 203, the communication is re-routed to the corresponding first available ATD 208*a-n*. The communication itself may be a voice call, voice message, or a notification message (e.g., email, SMS message, user MMS message, etc.) composed by the user of CTD 202, or translated via speech-to-text software of Host Carrier 204.

When an available ATD 208 common to IRMP 207 and Caller Contact List 203 has been established, the communication is connected between the ATD 208 and CTD 202 and maintained for the duration of the communication (e.g., until the CTD 202 or ATD 208 hangs up the call, until the text message is transmitted successfully, etc). It is important to note that, ATD 208*a-n* may be a telecommunication device, a personal computer, or a combination of any number of telecommunication devices or personal computers.

When no ATD 208*a-n* is available, software internal to CTD 202 (e.g., CRL 148) will instruct the user to leave a voicemail message, which will be retrievable when IRWTD 206 is either turned back on or the user becomes available.

Figure 3:
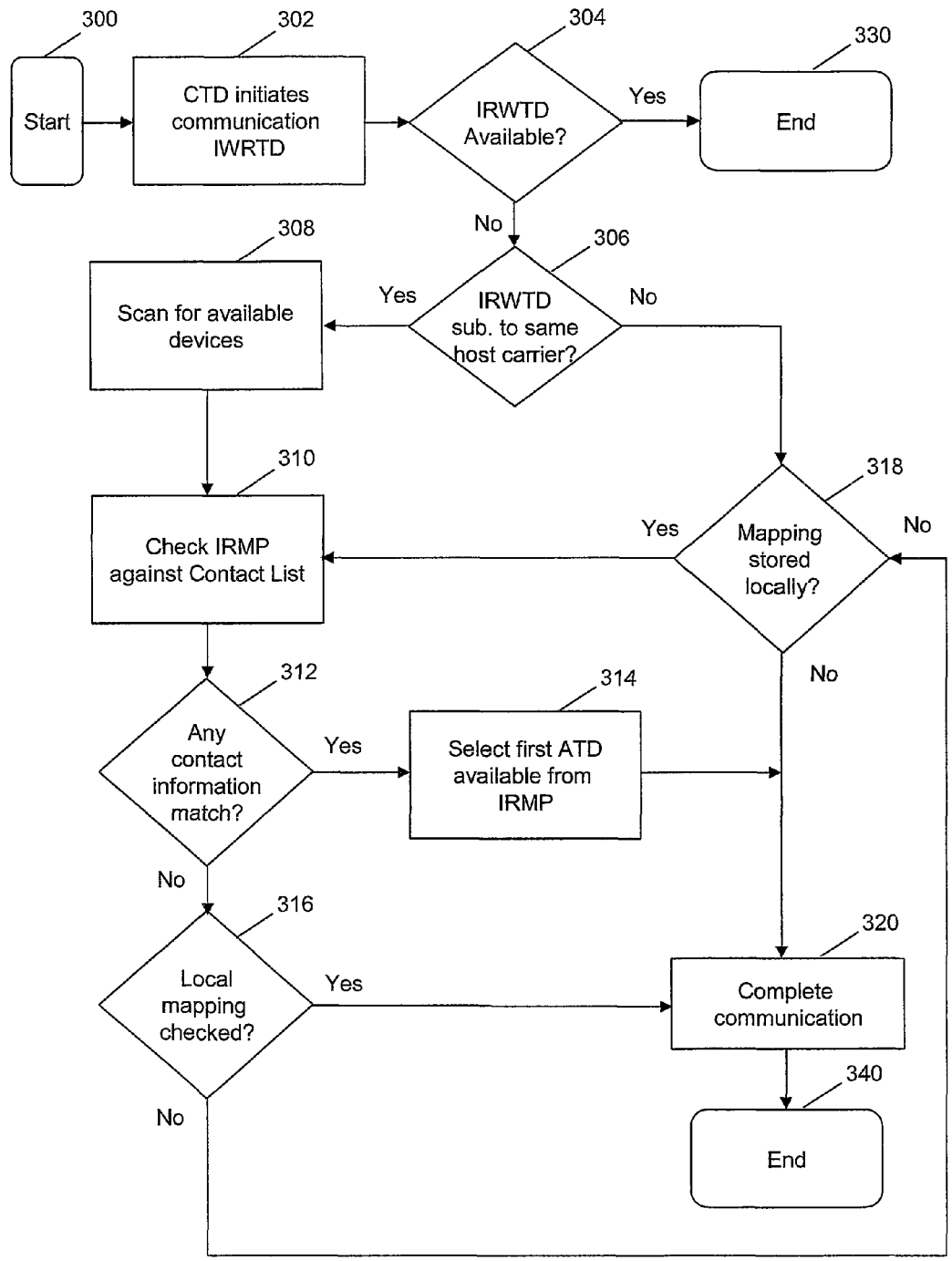
FIG. 3. is a high-level logical flowchart of an exemplary set of steps performed while performing re-routing of a phone call to a alternate telecommunication device based on a mutual contact in the mapping profiles of the caller telecommunication device and the intended receiving wireless telecommunication device.

With reference now to FIG. 3, a high-level logical flowchart of an exemplary set of steps for performing re-routing of a phone call to an alternate telecommunication device, based on a mutual contact in the mapping profiles of the caller telecommunication device and the intended receiving wireless telecommunication device, is presented. After initiator block 300, a communication is initiated from a Caller Telecommunication Device (CTD) to an Intended Receiving Wireless Telecommunication Device (IRWTD) (block 302). It is then determined by the Host Carrier if the IRWTD is available (block 304). If IRWTD is available, the call is completed (block 320) and the process ends at terminator block 330. When IRWTD is not available, the CTD pings the host carrier to determine if IRWTD subscribes to the same host carrier as the CTD (block 306). If IRWTD subscribes to the same host carrier as CTD then CTD initiates a scan for available ATDs proximate to IRWTD (block 308). CTD then downloads IRMP and compares it to the Caller Contact List for same ATDs within proximate range of IRWTD (block 310). CTD then determines if there is an available ATD common to IRMP and Caller Contact List (block 312). When common ATD(s) are available the first available ATD is selected as the recipient of the communication (block 314). The communication is then re-routed to the ATD (block 320). The process then terminates at block 340.

If there is not a common contact matching both IRMP and the caller contact list, the CTD device checks if the local mapping profile on the ATD has been compared (block 316). When the local mapping profiles have been previously checked and none are available on the ATDs, the re-routing attempt is terminated (block 320), and the process terminates at block 340.

When the local mapping has not been previously checked, the process continues to query block 318. If there is a local mapping available on the ATD (block 318), the mapping process loops back to block 310 in an iterative manner to determine if a common contact between the caller contact list and IRMP can be realized. If no available ATDs are common to IRMP and caller contact list, the re-routing attempt is terminated (block 320). The process then terminates at block 340.

Although aspects of the present invention have been described with respect to a computer processor and software, it should be understood that at least some aspects of the present invention may alternatively be implemented as a program product for use with a data storage system or computer system. Programs defining functions of the present invention can be delivered to a data storage system or computer system via a variety of data storage media, which include, without limitation, non-writable storage media (e.g. CD-ROM) and writable storage media (e.g. a floppy diskette, hard disk drive, read/write CD-ROM, optical media). It should be understood, therefore, that such data storage media, when storing computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to preferred embodiments thereof, it will be apparent that modifications and variations are possible without departing from the scope of the invention defined in the appended claims.

What is claimed is:

1. A method of routing an incoming communication, the method comprising:
   a caller telecommunication device transmitting a communication from a caller using the caller telecommunication device to an intended receiving wireless telecommunication device;
   the caller telecommunication device determining that a user of the intended receiving wireless telecommunication device is unavailable;
   in response to the caller telecommunication device determining that the user of the intended receiving wireless telecommunication device is unavailable, the caller telecommunication device requesting a mapping profile of the intended receiving wireless telecommunication device; and
   in response to the caller telecommunication device receiving the mapping profile of the intended receiving wireless telecommunication device, the caller telecommunication device:
      identifying one or more alternate telecommunication devices listed in both the mapping profile of the intended receiving wireless telecommunication device and a caller contact list of the caller telecommunication device,
      determining if a first alternate telecommunication device of the one or more alternate telecommunication devices is within a predefined proximity to the intended receiving wireless telecommunication device by triggering the first alternate telecommunication device to transmit a short range wireless query signal to the intended receiving wireless telecommunication device, and
      in response to the first alternate telecommunication device being within the predefined proximity to the intended receiving wireless telecommunication device, re-routing the communication to the first alternate telecommunication device.

2. The method of claim 1, wherein the caller contact list further comprises:
   a plurality of contact listings, wherein each of the contact listings corresponds to a known alternate telecommunication device that is known to the caller telecommunication device, and wherein each contact listing comprises at least one of the group consisting of:
- a name of a user of the known alternate telecommunication device;
- a personal information profile of the user of the known alternate telecommunication device;
- a phone number of the known alternate telecommunication device;
- an email address of the user of the known alternate telecommunication device; and
- a media access control (MAC) number of the known alternate telecommunication device.

3. The method of claim 1, wherein the mapping profile further comprises:
- a plurality of contact listings, wherein each of the contact listings corresponds to a known alternate telecommunication device that is known to the intended receiving wireless telecommunication device, and wherein each contact listing comprises at least one of the group consisting of:
  - a name of a user of the known alternate telecommunication device;
  - a personal information profile of the user of the known alternate telecommunication device;
  - a phone number of the known alternate telecommunication device;
  - an email address of the user of the known alternate telecommunication device; and
  - a media access control (MAC) number of the known alternate telecommunication device.

4. The method of claim 1, further comprising:
- in response to the re-routing of the communication to the first alternate telecommunication device failing, the caller telecommunication device re-routing the communication to a second alternate telecommunication device that is within the predefined proximity to the intended receiving wireless telecommunication device.

5. The method of claim 1, further comprising the caller telecommunication device retrieving the mapping profile of the intended receiving wireless telecommunication device from a host carrier of the intended receiving wireless telecommunication device.

6. The method of claim 5, wherein the mapping profile of the intended receiving wireless telecommunication device is autonomously uploaded to the host carrier at regular intervals specified by software internal to the intended receiving wireless telecommunication device.

7. The method of claim 5, wherein the mapping profile of the intended receiving wireless telecommunication device is manually uploaded to the host carrier by a user of the intended receiving wireless telecommunication device.

8. A caller telecommunication device comprising:
- one or more processors;
- one or more computer-readable tangible storage devices;
- program instructions, stored on at least one of the one or more storage devices for execution by at least one of the one or more processors, to transmit a communication from a caller using the caller telecommunication device to an intended receiving wireless telecommunication device;
- program instructions, stored on at least one of the one or more storage devices for execution by at least one of the one or more processors, to determine that a user of the intended receiving wireless telecommunication device is unavailable;
- program instructions, stored on at least one of the one or more storage devices for execution by at least one of the one or more processors, to in response to the caller telecommunication device determining that the user of the intended receiving wireless telecommunication device is unavailable, request a mapping profile of the intended receiving wireless telecommunication device; and
- program instructions, stored on at least one of the one or more storage devices for execution by at least one of the one or more processors, to, in response to the caller telecommunication device receiving the mapping profile of the intended receiving wireless telecommunication device:
  - identify one or more alternate telecommunication devices listed in both the mapping profile of the intended receiving wireless telecommunication device and a caller contact list of the caller telecommunication device;
  - determine if a first alternate telecommunication device of the one or more alternate telecommunication devices is within a predefined proximity to the intended receiving wireless telecommunication device by triggering the first alternate telecommunication device to transmit a short range wireless query signal to the intended receiving wireless telecommunication device; and
  - in response to the first alternate telecommunication device being within the predefined proximity to the intended receiving wireless telecommunication device, re-route the communication to the first alternate telecommunication device.

9. The caller telecommunication device of claim 8, wherein the caller contact list comprises a plurality of contact listings, wherein each of the contact listings corresponds to a known alternate telecommunication device that is known to the caller telecommunication device, and wherein each contact listing comprises at least one of the group consisting of:
- a name of a user of the known alternate telecommunication device;
- a personal information profile of the user of the known alternate telecommunication device;
- a phone number of the known alternate telecommunication device;
- an email address of the user of the known alternate telecommunication device; and
- a media access control (MAC) number of the known alternate telecommunication device.

10. The caller telecommunication device of claim 8, wherein the mapping profile further comprises a plurality of contact listings each of which corresponds to an alternate telecommunication device known to the intended receiving wireless telecommunication device, each contact listing comprising at least one of the group consisting of:
- a name of a user of the known alternate telecommunication device;
- a personal information profile of the user of the known alternate telecommunication device;
- a phone number of the known alternate telecommunication device;
- an email address of the user of the known alternate telecommunication device; and
- a media access control (MAC) number of the known alternate telecommunication device.

11. The caller telecommunication device of claim 8, wherein the communication is a phone call, wherein the caller telecommunication device further comprises:
- program instructions, stored on at least one of the one or more storage devices for execution by at least one of the one or more processors, to, in response to successfully re-routing the communication to the first alternate telecommunication device, maintain a connection between the caller telecommunication device and the first alternate telecommunication device for a duration of the communication.

12. The caller telecommunication device of claim 8, further comprising:
program instructions, stored on at least one of the one or more storage devices for execution by at least one of the one or more processors, to retrieve the mapping profile of the intended receiving wireless telecommunication device from a host carrier of the intended receiving wireless telecommunication device.

13. The caller telecommunication device of claim 12, wherein the mapping profile of the intended receiving wireless telecommunication device is autonomously uploaded to the host carrier at regular intervals specified by software internal to the intended receiving wireless telecommunication device.

14. The caller telecommunication device of claim 12, wherein the mapping profile of the intended receiving wireless telecommunication device is manually uploaded to the host carrier by a user of the intended receiving wireless telecommunication device.

15. A computer program product comprising:
one or more computer-readable tangible storage devices;
program instructions, stored on at least one of the one or more computer-readable tangible storage devices, to transmit a communication from a caller using a caller telecommunication device to an intended receiving wireless telecommunication device;
program instructions, stored on at least one of the one or more computer-readable tangible storage devices, to determine that a user of the intended receiving wireless telecommunication device is unavailable;
program instructions, stored on at least one of the one or more computer-readable tangible storage devices to, in response to determining that the user of the intended receiving wireless telecommunication device is unavailable, request a mapping profile of the intended receiving wireless telecommunication device; and
program instructions, stored on at least one of the one or more computer-readable tangible storage devices to, in response to the caller telecommunication device receiving the mapping profile of the intended receiving wireless telecommunication device:
identify one or more alternate telecommunication devices listed in both the mapping profile of the intended receiving wireless telecommunication device and the caller contact list of the caller telecommunication device;
determine if a first alternate telecommunication device of the one or more alternate telecommunication devices is within a predefined proximity to the intended receiving wireless telecommunication device by triggering the first alternate telecommunication device to transmit a short range wireless query signal to the intended receiving wireless telecommunication device' and
in response to the first alternate telecommunication device being within the predefined proximity to the intended receiving wireless telecommunication device, re-route the communication to the first alternate telecommunication device.

16. The computer program product of claim 15, wherein the contact list further comprises a plurality of contact listings a plurality of contact listings, wherein each of the contact listings corresponds to a known alternate telecommunication device that is known to the caller telecommunication device, and wherein each contact listing comprises at least one of the group consisting of:
a name of a user of the known alternate telecommunication device;
a personal information profile of the user of the known alternate telecommunication device;
a phone number of the known alternate telecommunication device;
an email address of the user of the known alternate telecommunication device; and
a media access control (MAC) number of the known alternate telecommunication device.

17. The computer program product of claim 15, wherein the mapping profile further comprises a plurality of contact listings, wherein each of the contact listings corresponds to an alternate telecommunication device known to the intended receiving wireless telecommunication device, and wherein each contact listing comprises at least one of the group consisting of:
a name of a user of the known alternate telecommunication device;
a personal information profile of the user of the known alternate telecommunication device;
a phone number of the known alternate telecommunication device;
an email address of the user of the known alternate telecommunication device; and
a media access control (MAC) number of the known alternate telecommunication device.

18. The computer program product of claim 15, wherein the communication is a phone call, the computer program product further comprising program instructions to, in response to successfully re-routing the communication to the first alternate telecommunication device succeeding, maintain a connection between the caller telecommunication device and the first alternate telecommunication device for a duration of the communication.

19. The computer program product of claim 15, further comprising program instructions to retrieve the mapping profile of the intended receiving wireless telecommunication device from a host carrier of the intended receiving wireless telecommunication device.

20. The computer program product of claim 19, wherein the mapping profile of the intended receiving wireless telecommunication device is autonomously uploaded to the host carrier at regular intervals specified by software internal to the intended receiving wireless telecommunication device.

* * * * *